(12) United States Patent
Grüner et al.

(10) Patent No.: US 9,631,097 B2
(45) Date of Patent: Apr. 25, 2017

(54) WEATHER-RESISTANT PEARLESCENT PIGMENTS, PROCESS FOR THE PRODUCTION AND USE THEREOF

(71) Applicant: Eckart GmbH, Hartenstein (DE)

(72) Inventors: Michael Grüner, Auerbach (DE); Günter Kaupp, Neuhaus (DE); Thomas Schneider, Lauf a. d. Pegnitz (DE)

(73) Assignee: ECKART GMBH, Hartenstein (DE)

( * ) Notice: Subject to any disclaimer, the term of this patent is extended or adjusted under 35 U.S.C. 154(b) by 0 days.

(21) Appl. No.: 14/432,838

(22) PCT Filed: Sep. 30, 2013

(86) PCT No.: PCT/EP2013/070376
§ 371 (c)(1),
(2) Date: Apr. 1, 2015

(87) PCT Pub. No.: WO2014/053454
PCT Pub. Date: Apr. 10, 2014

(65) Prior Publication Data
US 2015/0259536 A1      Sep. 17, 2015

(30) Foreign Application Priority Data
Oct. 2, 2012   (DE) .................. 10 2012 109 407

(51) Int. Cl.
C09C 1/00   (2006.01)
C09D 5/36   (2006.01)
G03G 5/06   (2006.01)

(52) U.S. Cl.
CPC .......... C09C 1/0015 (2013.01); C09C 1/0039 (2013.01); C09D 5/36 (2013.01); C01P 2002/85 (2013.01); C01P 2004/04 (2013.01); C01P 2004/20 (2013.01); C01P 2004/51 (2013.01); C01P 2004/54 (2013.01); C09C 2200/10 (2013.01); C09C 2200/102 (2013.01); C09C 2200/1004 (2013.01); C09C 2200/1087 (2013.01); C09C 2200/302 (2013.01); C09C 2200/304 (2013.01); C09C 2200/407 (2013.01); C09C 2200/408 (2013.01); C09C 2220/106 (2013.01)

(58) Field of Classification Search
CPC ....................................................... C09D 5/36
See application file for complete search history.

(56) References Cited

U.S. PATENT DOCUMENTS

| | | | |
|---|---|---|---|
| 4,086,100 A | 4/1978 | Esselborn et al. | |
| 4,544,415 A | 10/1985 | Franz et al. | |
| 5,017,207 A | 5/1991 | Watkinson et al. | |
| 5,022,923 A * | 6/1991 | Rau | C09C 1/0009 |
| | | | 106/415 |
| 5,472,491 A | 12/1995 | Duschek et al. | |
| 5,629,400 A | 5/1997 | Standke et al. | |
| 5,679,147 A | 10/1997 | Standke et al. | |
| 5,759,255 A | 6/1998 | Venturini et al. | |
| 6,113,873 A | 9/2000 | Tunashima et al. | |
| 6,176,918 B1 | 1/2001 | Glausch et al. | |
| 6,761,762 B1 | 7/2004 | Greiwe et al. | |
| 7,413,599 B2 | 8/2008 | Henglein et al. | |
| 2006/0042509 A1* | 3/2006 | Henglein | C09C 1/0015 |
| | | | 106/415 |
| 2008/0295736 A1 | 12/2008 | Lin et al. | |
| 2009/0056591 A1* | 3/2009 | Schmidt | C09C 1/0015 |
| | | | 106/415 |
| 2010/0116169 A1 | 5/2010 | Kaupp et al. | |
| 2010/0297045 A1 | 11/2010 | Kaupp et al. | |
| 2011/0259243 A1* | 10/2011 | Schumacher | C09C 1/0024 |
| | | | 106/417 |
| 2011/0265689 A1* | 11/2011 | Schumacher | C09C 1/0024 |
| | | | 106/417 |
| 2014/0018439 A1 | 1/2014 | Gruner et al. | |

FOREIGN PATENT DOCUMENTS

| | | |
|---|---|---|
| CN | 102282219 A | 12/2011 |
| CN | 103459516 B | 4/2015 |
| DE | 10348174 A1 | 5/2004 |
| DE | 102006009130 A1 | 8/2007 |
| EP | 0141174 B1 | 8/1987 |
| EP | 0289240 B1 | 4/1992 |
| EP | 0632109 A1 | 1/1995 |
| EP | 0870730 A1 | 10/1998 |
| EP | 0675128 B1 | 12/2001 |
| EP | 0888410 B1 | 4/2002 |
| EP | 0716127 B1 | 7/2002 |
| EP | 1084198 B1 | 7/2002 |
| EP | 0716128 B1 | 12/2002 |
| EP | 0881998 B1 | 6/2004 |
| EP | 1808465 A1 | 7/2007 |
| EP | 1682622 B1 | 8/2007 |
| EP | 1980594 B1 | 6/2009 |
| EP | 2093260 A1 | 8/2009 |
| EP | 2217664 B1 | 6/2011 |
| JP | S51143027 A | 12/1976 |
| JP | S51143207 A | 12/1976 |
| JP | 2000505833 A | 5/2000 |
| JP | 2008063525 A | 3/2008 |
| WO | 2004056716 A1 | 7/2004 |
| WO | 2005063637 A1 | 7/2005 |

* cited by examiner

Primary Examiner — Mark V Stevens
(74) Attorney, Agent, or Firm — The Webb Law Firm

(57) ABSTRACT

The present invention relates to weather-resistant pearlescent pigment, comprising a coated or uncoated platelet-shaped substrate which is selected from the group consisting of synthetic mica platelets, glass platelets, $SiO_2$ platelets, $Al_2O_3$ platelets, synthetic boehmite platelets, BiOCl platelets and mixtures thereof, a chromophoric coating with at least one highly refractive metal oxide, and a top layer, wherein the top layer comprises the following layer sequence:
a) a first layer made of tin oxide and/or tin hydroxide and/or hydrated tin oxide, b) a second cerium-containing layer which comprises cerium oxide and/or cerium hydroxide and/or hydrated cerium oxide, c) an organic-chemical coating applied to the cerium-containing layer which contains oligomeric silanes or consists of them, wherein the oligomeric silanes have one or more amino groups and the oligomeric silanes are chemically bonded with the cerium-containing layer. The invention further relates to a process for the production and use of these pearlescent pigments.

24 Claims, No Drawings

WEATHER-RESISTANT PEARLESCENT PIGMENTS, PROCESS FOR THE PRODUCTION AND USE THEREOF

CROSS-REFERENCE TO RELATED APPLICATIONS

This application is the United States national phase of International Application No. PCT/EP2013/070376 filed Sep. 30, 2013, and claims priority to German Patent Application No 10 2012 109 407.1 filed Oct. 2, 2012, the disclosures of each of which are hereby incorporated by reference in their entirety.

BACKGROUND OF THE INVENTION

Field of the Invention

The present invention relates generally to weather-resistant pearlescent pigments.

Description of Related Art

Pearlescent pigments which contain titanium dioxide in the top layer or which are made up of particulate $TiO_2$ have a degree of photocatalytic activity. If UV light acts on a pearlescent pigment in the presence of water and oxygen, the UV activity of the pearlescent pigment can trigger an accelerated decomposition of organic compounds, e.g. of a binder matrix. Even the proportion of UV contained in daylight can cause this reaction, i.e. for applications such as automotive coatings which are directly exposed to the weather, specially stabilized pearlescent pigments must be used. In order to counteract this adverse effect for external application, pearlescent pigments can be provided with various protective coatings to reduce the photoactivity. Starting from aqueous metal salt solutions, poorly soluble compounds are usually precipitated as metal oxides onto the surface of the pigments. Two different metal oxides are predominantly used here. In order to promote the compatibility of the pigments with different coatings, but in particular with the more environmentally sustainable water-based systems, as a rule an additional organic modification of the top layer is also applied, e.g. by means of silanes.

According to the teaching of EP 0 632 109 A1 a three-layered protective layer is applied to a platelet-shaped substrate coated with metal oxides. In a first step an $SiO_2$ layer is applied, in a second step a hydroxide or hydrated oxide of cerium, aluminum or zirconium is applied and in a third step at least one hydroxide or hydrated oxide of cerium, aluminum or zirconium and an organic coupling reagent are applied. This three-layered structure is disadvantageously very laborious and correspondingly cost-intensive to produce. In addition the coupling reagents have to be hydrolyzed before binding to the pigment surface, wherein, however, according to the teaching of EP 0 888 410 B1, only a maximum of 60% of the added coupling reagents can be bound to the pigment surface.

EP 0 888 410 B1 discloses modified pearlescent pigments based on a platelet-shaped substrate coated with metal oxides. According to the teaching of EP 0 888 410 B1, the top layer consists of at least two oxides, a mixture of oxides, or mixed oxides of silicon dioxide, aluminum oxide, cerium oxide, titanium dioxide or zirconium dioxide and a water-based oligomeric silane.

EP 1 682 622 B1 also discloses a top layer made of two metal oxides, wherein here first a cerium oxide layer must be precipitated and subsequently an $SiO_2$ layer. Silanes are likewise predominantly used as coupling reagents.

EP 0 881 998 B1 discloses weather-resistant pearlescent pigments with a top layer either made of aluminum oxide or again of a two-layered structure made of aluminum oxide and cerium oxide as well as silanes as coupling reagents.

EP 0 141 174 B1 discloses weather-resistant pearlescent pigments with a top layer which contains cerium hydroxide. In this document it is proposed that this top layer be supplemented by a silicate layer and preferably by further oxide layers, such as aluminum oxide or zinc oxide, in order to guarantee a better binding of polymeric siloxanes which can function as coupling agents.

DE 103 48 174 A1 discloses weather-resistant pearlescent pigments in the case of which, i.a., a layer of tin dioxide in the top layer guarantees the condensation water stability.

In the above-named state of the art, the UV activity of the highly refractive $TiO_2$ layer is usually suppressed by at least two different oxide layers or a mixed layer of two oxides.

In EP 1 084 198 B1 effect pigments are described which, because of their surface modification with reactive orientation agents, have very good adhesion to the base coat. However, EP 1 084 198 B1 does not disclose any weather- and UV-resistant pearlescent pigments.

The available weather-resistant coatings reach their limits when it comes to the coating of optically very high-quality pearlescent pigments. When synthetic substrates such as for example glass flakes, i.e. glass platelets, or synthetic mica are used, pearlescent pigments are obtained which are very pure in terms of color. Any subsequent coating in the form of a top layer for weather-resistance can easily lead to undesired color changes in the optical impression of the pearlescent pigment. These can have various causes: the coating can have an inherent color, which is the case e.g. with cerium oxides. When very thick top layers are used, an optical shift can take place as a result of interference, for example when using $ZrO_2$, or there can be a loss of gloss, for example when using $SiO_2$. In particular in the case of pearlescent pigments with very thick $TiO_2$ layers, which lead to interferences in the region of the third order, and very fine, i.e. very thin substrates, the photocatalytic activity of the $TiO_2$ layer is particularly pronounced and distortion occurs with and in the case of the known stabilising systems.

On the other hand, when using a top layer which is very thin as a whole to prevent optical distortion, this must still guarantee the weather-resistance of the pearlescent pigment very effectively.

SUMMARY OF THE INVENTION

In some examples, there is provided a weather-resistant pearlescent pigment, comprising: a coated or uncoated platelet-shaped substrate which is selected from the group consisting of synthetic mica platelets, glass platelets, $SiO_2$ platelets, $Al_2O_3$ platelets, synthetic boehmite platelets, BiOCl platelets and mixtures thereof, a chromophoric coating comprising at least one highly refractive metal oxide, and a top layer, wherein the top layer comprises the following layer sequence: a) a first layer comprising tin oxide and/or tin hydroxide and/or hydrated tin oxide, b) a second cerium-containing layer which comprises cerium oxide and/or cerium hydroxide and/or hydrated cerium oxide, c) an organic-chemical coating applied to the cerium-containing layer which comprises one or more oligomeric silane(s), wherein the oligomeric silane(s) have one or more amino groups and the oligomeric silane(s) are chemically bonded with the cerium-containing layer.

In some examples, there is provided a process for the production of the weather-resistant pearlescent pigment(s)

described herein, wherein the process comprises the following steps: a) optionally classifying coated or uncoated platelet-shaped substrates, obtaining substrates which preferably have the values $D_{10}$, $D_{50}$, $D_{90}$ from a cumulative frequency distribution of a volume-averaged size distribution function with a span ΔD in a range of from 0.7-1.4, b) suspending coated or uncoated platelet-shaped substrates, optionally from step a), in aqueous solution, and coating the coated or uncoated platelet-shaped substrates with one or more highly refractive metal oxide(s), obtaining pearlescent pigments which are optionally calcined, c) coating the pearlescent pigments coated in step b) in aqueous solution with tin oxide, tin hydroxide and/or hydrated tin oxide by hydrolysis of a tin salt or of a hydrolyzable tin metalorganic compound in a pH range of from 1.5 to 3.0, d) coating the pearlescent pigments coated in step c) in aqueous solution with cerium oxide, cerium hydroxide and/or hydrated cerium oxide by hydrolysis of a cerium salt or of a hydrolyzable cerium metalorganic compound, e) coating the pearlescent pigments coated in step d) in aqueous solution with one or more oligomeric silane(s), f) separating off the pearlescent pigments coated in step e), optionally washing with demineralized water, and g) optionally drying the pearlescent pigments of step f).

DETAILED DESCRIPTION

The object of the present invention is therefore to provide a weather-resistant pearlescent pigment which does not have the above-named disadvantages of the state of the art. In particular, the weather-resistant pearlescent pigments are not to be impaired by a top layer as regards their optical properties and are to be readily available. At the same time, the top layer is to guarantee a highly effective weather-resistance.

The object is achieved by the provision of a weather-resistant pearlescent pigment comprising
a coated or uncoated platelet-shaped substrate which is selected from the group consisting of synthetic mica platelets, glass platelets, $SiO_2$ platelets, $Al_2O_3$ platelets, synthetic boehmite platelets, BiOCl platelets and mixtures thereof,
a chromophoric coating with at least one highly refractive metal oxide, and
a top layer,
characterized in that
the top layer comprises the following layer sequence:
a) a first layer made of tin oxide and/or tin hydroxide and/or hydrated tin oxide,
b) a second cerium-containing layer which comprises cerium oxide and/or cerium hydroxide and/or hydrated cerium oxide,
c) an organic-chemical coating applied to the cerium-containing layer which contains oligomeric silanes or consists of them, wherein the the oligomeric silanes have one or more amino groups and the oligomeric silanes are chemically bonded with the cerium-containing layer.

Preferred developments are specified in the dependent claims 2 to 16.

A further object of the invention is to provide a simple and cost-effective process for the production of the pearlescent pigments according to the invention.

The object was achieved by a process for the production of weather-resistant pearlescent pigment according to one of the previous claims,
characterized in that
the process comprises the following steps:
a) optionally classifying coated or uncoated platelet-shaped substrates, obtaining substrates which preferably have the values $D_{10}$, $D_{50}$, $D_{90}$ from a cumulative frequency distribution of a volume-averaged size distribution function with a span ΔD in a range of from 0.7-1.4,
b) suspending coated or uncoated platelet-shaped substrates, optionally from step a), in aqueous solution, and coating the coated or uncoated platelet-shaped substrates with one or more highly refractive metal oxide(s), obtaining pearlescent pigments which are optionally calcined,
c) coating the pearlescent pigments coated in step b) in aqueous solution with tin oxide, tin hydroxide and/or hydrated tin oxide by hydrolysis of a tin salt or of a hydrolyzable tin metalorganic compound in a pH range of from 1.5 to 3.0,
d) coating the pearlescent pigments coated in step c) in aqueous solution with cerium oxide, cerium hydroxide and/or hydrated cerium oxide by hydrolysis of a cerium salt or of a hydrolyzable cerium metalorganic compound,
e) coating the pearlescent pigments coated in step d) in aqueous solution with oligomeric silanes,
f) separating off the pearlescent pigments coated in step e), optionally washing with demineralized water, and
g) optional drying, preferably at a temperature from a range of from 80° to 160° C.

The present invention provides weather-resistant pearlescent pigments with optically very high-quality properties. By optically very high-quality properties is meant in particular an excellent gloss and color purity of the pearlescent pigments in an application medium.

These high-quality optical properties are also significantly influenced by the quality of the platelet-shaped substrate.

For this reason, in the production of the pearlescent pigments according to the invention exclusively synthetic platelet-shaped substrates are used which, in contrast to for example natural mica platelets, have very smooth surfaces and sharp fracture edges.

According to the invention, the platelet-shaped substrates are selected from the group consisting of synthetic mica platelets, glass platelets, $SiO_2$ platelets, $Al_2O_3$ platelets, synthetic boehmite platelets, BiOCl platelets and mixtures thereof.

The platelet-shaped synthetic substrates are preferably selected from the group consisting of synthetic mica platelets, glass platelets, $Al_2O_3$ platelets and mixtures thereof. The platelet-shaped synthetic substrates are particularly preferably selected from the group consisting of glass platelets, synthetic mica platelets and mixtures thereof.

The above-named synthetic substrates are known from a series of patent applications and patents. If, e.g., the platelet-shaped synthetic substrate consists of glass platelets, those produced according to the processes described in EP 0 289 240 A1, WO 2004/056716 A1 and WO 2005/063637 A1 are preferably used within the framework of this invention. The glass platelets which can be used as substrate can, for example, have a composition corresponding to the teaching of EP 1 980 594 B1.

The glass platelets, also called glass flakes, described in these documents are characterized by particularly homogeneous surfaces and thicknesses of the platelets. The thickness of the glass platelets preferably varies with a standard deviation of at most 20%, further preferably of at most 15%, still further preferably of at most 10%. The average thicknesses of the glass platelets lie in a range of from 20 to 2,000 nm, preferably in a range of from 100 to less than 1,000 nm.

These glass platelets are preferably those which were produced according to the following process (see EP 0 289 240 B1):

feeding a stream of molten glass in a downwards direction into a rotating cup allowing the glass melt to flow over the edge of the cup such that it is forced into a gap between two plates surrounding the cup, wherein the movement of the material takes place in a radial direction and is effected by a stream of air between the plates such that the radial stream is pushed in the radial direction such that it remains flat and the material, when it solidifies, is broken into flakes.

Optically particularly high-quality pearlescent pigments based on synthetic substrates are also known from EP 2 217 664 B1 the content of which is hereby incorporated by reference. It can be learned from the teaching of EP 2 217 664 B1 that substrates with a narrow size distribution surprisingly make it possible to provide pearlescent pigments with particularly high color purity and high gloss.

In an embodiment of the present invention, the weather-resistant pearlescent pigments according to the invention have a cumulative frequency distribution of a volume-averaged size distribution function with the values $D_{10}$, $D_{50}$ and $D_{90}$, wherein this cumulative frequency distribution has a span $\Delta D$ in a range of from 0.7-1.4. The span $\Delta D$ is calculated according to Formula (I):

$$\Delta D = (D_{90} - D_{10})/D_{50} \tag{I}$$

According to the invention the span $\Delta D$ is used to characterize the particle size distribution. The smaller the span is, the narrower the particle size distribution is.

In particularly preferred embodiments, the weather-resistant pearlescent pigments according to the invention have a span $\Delta D$ in a range of from 0.75-1.3, further preferably in a range of from 0.8 to 1.2 and still further preferably in a range of from 0.85 to 1.1.

No sufficiently color-pure pearlescent pigments are obtained above a span $\Delta D$ of 1.4. Within the framework of the customary methods, pearlescent pigments below a span of the size distribution of 0.7 can only be produced very laboriously and thus no longer economically.

Pearlescent pigments with the span $\Delta D$ values listed above as preferred have excellent color purities. This is particularly true for pearlescent pigments in which the substrate has an average thickness of from 500 to 2000 nm, further preferably of from 500 to 1200 nm.

Thus these parameters of the size distribution function and preferably of the average thickness of the pearlescent pigment substrate interact in a synergetic way with the weather-resistant coating according to the invention. In such optically high-quality pearlescent pigments even small optical losses as a result of insufficient stabilization on the one hand or a too thick or otherwise optically distorting weather-resistant layer (such as for example swelling layers) can have a very distorting effect.

The weather-resistant pearlescent pigments according to the invention can have any average particle size $D_{50}$. The $D_{50}$ values of the pigments according to the invention preferably lie in a range of from 3 to 80 µm. The pigments according to the invention preferably have a $D_{50}$ value from a range of from 5 to 63 µm, particularly preferably from a range of from 7 to 56 µm and quite particularly preferably from a range of from 9 to 40 µm.

The $D_{10}$ values of the pigments according to the invention preferably lie in a range of from 1 to 25 µm. The pigments according to the invention preferably have a $D_{10}$ value from a range of from 2 to 21 µm, particularly preferably from a range of from 3 to 18 µm and quite particularly preferably from a range of from 4 to 14 µm.

The $D_{90}$ values of the pigments according to the invention preferably lie in a range of from 6 to 250 µm. The pigments according to the invention preferably have a $D_{90}$ value from a range of from 15 to 210 µm.

The $D_{10}$, $D_{50}$ or $D_{90}$ value of the cumulative frequency distribution of the volume—averaged size distribution function, as obtained by laser diffraction methods, indicates that 10%, 50% or 90%, respectively, of the pigments according to the invention have a diameter which is equal to or smaller than the value indicated in each case. Here, the size distribution curve of the pigments is determined with a device from Malvern (device: MALVERN Mastersizer 2000) according to the manufacturer's instructions. The scattered light signals were evaluated according to the Fraunhofer method.

The average thickness of the platelet-shaped synthetic substrates to be coated preferably lies in a range of from 50 nm to 5000 nm, preferably in a range of from 60 nm to 3000 nm and particularly preferably in a range of from 70 nm to 2000 nm.

In an embodiment of the invention, the average thickness for glass platelets as platelet-shaped substrate to be coated preferably lies in a range of from 750 nm to 1500 nm. Such glass platelets are widely available commercially. Thinner glass platelets offer further advantages. Thinner substrates lead to a smaller total layer thickness of the pigments according to the invention. Glass platelets, the average thickness of which lies in a range of from 100 nm to 700 nm, further preferably in a range of from 150 nm to 600 nm, particularly preferably in a range of from 170 nm to 500 nm and quite particularly preferably in a range of from 200 nm to 400 nm, are thus also preferred according to the invention.

In a further embodiment, the average thickness for synthetic mica as platelet-shaped substrate to be coated preferably lies in a range of from 100 nm to 700 nm, further preferably in a range of from 120 nm to 600 nm, particularly preferably in a range of from 140 nm to 500 nm and quite particularly preferably in a range of from 150 nm to 450 nm.

If platelet-shaped synthetic substrates below an average thickness of 50 nm are coated with, for example, highly refractive metal oxides, extremely fragile pigments are obtained which can break apart even when incorporated into an application medium which in turn results in a significant reduction in gloss. In addition, the times for coating these thin substrates with, for example, highly refractive metal oxides are very long because of the large specific surface areas, i.e. the surface area per weight unit of pigment, of these platelet-shaped synthetic substrates, which gives rise to high production costs. Above an average substrate thickness of 5000 nm, the pigments can be too thick overall. This can be associated with a poorer specific covering capacity, i.e. covered area per weight unit of pigment according to the invention, and a lower plane-parallel orientation in an application medium. A poorer orientation results in turn in a reduced gloss.

In a preferred embodiment the standard deviation of the thickness of the artificial substrate is 15% to 100%, particularly preferably 20 to 70% and quite particularly preferably 22 to 40%.

Below a standard deviation of 15%, color-flop effect pigments are obtained. Above a standard deviation of 100%, much thicker pigments are contained in the entire pigment system such that poorer orientation and thus losses in gloss then result.

The average thickness is determined using a cured coating film in which the effect pigments are orientated substantially plane-parallel to the base. For this, a cross-section polish of the cured coating film is examined under a scanning electron microscope (SEM), wherein the thickness of at least 100 pearlescent pigments is determined and statistically averaged.

The platelet-shaped substrates used according to the invention can be coated or uncoated platelet-shaped substrates. For example, low refractive layers, for example in the form of $Al_2O_3$ and/or $SiO_2$ can also be applied to the platelet-shaped substrates. However, a highly refractive layer is preferably applied as outermost layer. An extremely thin layer of $SnO_2$, which effects a rutilization of a subsequently applied $TiO_2$ layer, can also be applied to the platelet-shaped substrate. By a rutilization is meant that applied $TiO_2$ is not present in the anatase structure but rather the formation of the rutile structure is induced. The rutile structure can, however, also be effected by applying $SnO_2$ and $TiO_2$ jointly with the result that a separate $SnO_2$ layer is not absolutely necessary for the application of a $TiO_2$ layer with rutile structure.

According to a preferred variant of the invention, uncoated platelet-shaped substrates are used.

The platelet-shaped substrates are coated with at least one highly refractive metal oxide layer in order to obtain the usual pearlescent effect based on interference. Within the framework of this invention, by a highly refractive metal oxide layer is meant a layer with a refractive index >1.8, preferably >2.0.

The at least one highly refractive layer preferably contains or consists of metal oxides, metal hydroxides and/or hydrated metal oxides which are selected from the group consisting of $TiO_2$, $Fe_2O_3$, $Fe_3O_4$, $TiFe_2O_5$, $Fe_2Ti_3O_9$, $FeTiO_3$, $ZnO$, $SnO_2$, $CoO$, $Co_3O_4$, $ZrO_2$, $Cr_2O_3$, $VO_2$, $V_2O_3$, $(Sn,Sb)O_2$ and mixtures thereof.

The at least one highly refractive layer particularly preferably contains or consists of metal oxides, metal hydroxides and/or hydrated metal oxides which are selected from the group consisting of $TiO_2$, $Fe_2O_3$, $Fe_3O_4$, $TiFe_2O_5$, $Fe_2Ti_3O_9$, $FeTiO_3$ and mixtures thereof.

In particularly preferred embodiments, the substrate is coated with only one (number: 1) highly refractive metal oxide layer which is preferably selected from the group consisting of $TiO_2$, $Fe_2O_3$, $TiFe_2O_5$, $Fe_2Ti_3O_9$, $FeTiO_3$ and mixtures thereof.

In a quite particularly preferred embodiments, the substrate is coated with only one (number: 1) highly refractive metal oxide layer which consists of $TiO_2$ in the rutile modification. By rutile modification (or rutile $TiO_2$) is meant in the sense of this invention that at least 99 wt.-% of the $TiO_2$ is present as rutile, wherein the indication in wt.-% refers to the total $TiO_2$ content in the respective layer.

In a further, particularly preferred embodiment, the chromophoric, highly refractive coating comprises rutile $TiO_2$, i.e. $TiO_2$ in the rutile modification, in a quantity from a range of from 30 to 80 wt.-%, relative to the total weight of the pearlescent pigment. The particularly intensive interference color shades of the third order typically lie in this range. The proportion of the rutile $TiO_2$ coating further preferably lies in a range of from 40-70 wt.-%, still further preferably in a range of 45-60 wt.-%, in each case relative to the total weight of the pearlescent pigment.

Such amount proportions of rutile $TiO_2$ correspond, individually depending on the fineness and thus on the specific surface area of the platelet-shaped substrate, to a preferred average thickness of the rutile $TiO_2$ layer from a range of from 80-280 nm. The average thickness of the rutile $TiO_2$ layer particularly preferably lies in a range of from 100 to 270 nm.

At these layer thicknesses, as a rule an interference color of the third order is obtained. Due to the large layer thickness of the rutile $TiO_2$ layer the pigments have a particularly high photocatalytic activity. Accordingly an undesired discoloration of a color or coating layer containing $TiO_2$-containing pigments occurs very readily with the action of UV radiation.

In further embodiments of the pearlescent pigments according to the invention, highly refractive layers are applied to the substrate in the form of a multilayer layer sequence. By this is meant an alternating layer sequence highly refractive, low refractive and highly refractive on the substrate. Here too, $TiO_2$ and in particular rutile $TiO_2$ is preferred as highly refractive layer.

According to a preferred variant of the invention, the at least one applied highly refractive metal oxide layer is calcined. Therefore, the platelet-shaped substrates provided with at least one highly refractive layer can be calcined.

However, any calcination is preferably to be carried out before the application of the top layer to be used according to the invention.

A top layer to be used according to the invention has a layer structure in which first a layer of or with, preferably of, tin oxide, preferably $SnO_2$, and/or tin hydroxide and/or hydrated tin oxide and then a layer of or with, preferably of, cerium oxide and/or cerium hydroxide and/or hydrated cerium oxide is applied to the platelet-shaped substrate. Therefore, the top layer to be used according to the invention has a substructure of at least two, preferably of two, layers.

Completely surprisingly, with this layer sequence, a synergetically acting layer structure was found with a very high effectiveness and effectivity with regard to the properties associated with weather-resistance such as condensation water resistance, good swelling behavior and a high UV resistance.

The effectiveness is of these two oxide layers is much higher compared with coatings with a top layer of only one of the two oxide layers. On the other hand, it is not necessary and is even disadvantageous to use a three-layered structure with an outer $SiO_2$ layer, as described in EP 1 682 622 B1.

The tin oxide-containing layer comprises or consists of tin oxide, preferably $SnO_2$, tin hydroxide and/or hydrated tin oxide. The tin oxide-containing layer preferably consists of tin oxide, preferably $SnO_2$, tin hydroxide and/or hydrated tin oxide. According to the invention, by a tin oxide layer is meant that this layer can also contain tin hydroxide and/or hydrated tin oxide in addition to tin oxide.

The quantity of tin oxide, preferably $SnO_2$, tin hydroxide and/or hydrated tin oxide in the top layer, in each case calculated as $SnO_2$, preferably lies according to the invention in a range of from 0.4 to 4.0 wt.-%, relative to the total weight of the pearlescent pigment. Particularly preferably the quantity of tin oxide, tin hydroxide and/or hydrated tin oxide, calculated as $SnO_2$, lies in a range of from 1.0 to 3.0 wt.-% and quite particularly preferably in a range of from 1.2 to 2.5 wt.-%, in each case relative to the total weight of the pearlescent pigment.

Below 0.4 wt.-% the effectiveness with regard to the necessary UV resistance is too low. Above 4.0 wt.-% the interference color is noticeably changed by the tin oxide, tin hydroxide and/or hydrated tin oxide layer which forms, which is undesirable in the interests of a simple production process.

The tin oxide is preferably present as $SnO_2$. Tin oxide forms by drying of tin hydroxide or hydrated tin oxide.

The proportion of $SnO_2$ can is determined for example by means of X-ray fluorescence analysis (XRFA). For this, lithium tetraborate is added to the pigments, they are melted in an oxidizing atmosphere and measured as a homogeneous glass tablet. The Advantix ARL device from Thermo Scientific is preferably used as measuring device. In order, if necessary, to differentiate the proportion of $SnO_2$ in the top layer from that in a rutile TiO layer, XPS or auger electron spectroscopy in combination with sputtering are available. By this means, additionally a depth profile of the elements of the surface coating is also obtained.

The cerium-containing layer comprises or consists of cerium oxide and/or cerium hydroxide and/or hydrated cerium oxide. The cerium-containing layer preferably consists of cerium oxide and/or cerium hydroxide and/or hydrated cerium oxide. According to the invention, by a cerium oxide layer is meant that this layer can also contain cerium hydroxide and/or hydrated cerium oxide in addition to cerium oxide.

Cerium oxide forms after drying of the pigments at an increased temperature.

It has surprisingly been shown that even in very small quantities the cerium-containing layer in combination with a tin oxide layer already makes adequate UV protection possible, although in the present invention a further protective layer is dispensed with.

In preferred embodiments, the quantity of the cerium-containing layer, calculated as elemental cerium, lies in a range of from 0.1 to 1.5 wt.-%, relative to the total weight of the pearlescent pigment. The quantity of the cerium-containing layer is converted to elemental cerium. From this it is also possible to convert easily to a content of $Ce_2O_3$, wherein this is an operand which does not necessarily mean that the cerium-containing compound is actually present partially or completely as $Ce_2O_3$.

The proportion by weight of cerium oxide, calculated as elemental cerium and relative to the quantity of pearlescent pigment used, should preferably not be more than 1.5 wt.-%, as otherwise losses in the optical quality of the pigment could be too great. Moreover, with quantities of more than 1.5 wt.-% a distorting yellowness becomes noticeable. In the case of the present invention the reason why this yellowness is so striking is that the pearlescent pigments according to the invention have optically very high-quality properties and even small impairments have a very distorting effect. On the other hand, below a proportion by weight of 0.1 wt.-%, as a rule the additional UV resistance is not sufficiently pronounced. In the individual case, the proportion by weight depends on the fineness and consequently on the specific surface area of the pearlescent pigment and on the layer thickness of the metal oxide layer, preferably $TiO_2$ layer. In general, finer pigments and thicker $TiO_2$ layers also require a higher content of cerium oxide and/or cerium hydroxide and/or hydrated cerium oxide.

In particularly preferred embodiments, the quantity of the cerium-containing layer, calculated as elemental cerium, lies in a range of from 0.2 to 1.0 wt.-%, further preferably in a range of from 0.35 to 0.9 wt.-%, in each case relative to the total weight of the pearlescent pigment.

The cerium oxide content of the cerium-containing layer is likewise, for example, determined by means of X-ray fluorescence analysis (XRFA). A further method for determining the cerium oxide content in the top layer is XPS. In this method, in combination with sputtering, additionally a depth profile of the elements of the surface coating can be obtained. The cerium content of the cerium-containing layer is preferably ascertained by means of X-ray fluorescence analysis.

In highly preferred embodiments, the coating of the pearlescent pigments with the cerium-containing protective layer takes place in aqueous environment. It is believed that in this case—in contrast to the route of deposition from organic solvents described in EP 1 682 622 B1—a better structured, more uniform protective layer is formed. It therefore also appears that only a very small amount of material is required in order to obtain a sufficient UV and weather resistance.

The proportion of top layer on all of the pearlescent pigment preferably lies in a range of from 1.0 to 5.0 wt.-%, relative to the total weight of the pearlescent pigment. Particularly preferably the proportion of the top layer lies in a range of from 2.0 to 4.0 wt.-%, relative to the total weight of the pearlescent pigment.

It is further preferred that the weight ratio of tin oxide, calculated as $SnO_2$, to cerium, calculated as elemental cerium, in the top layer lies in a range of from 2 to 10. Particularly preferably the weight ratio of tin oxide, calculated as $SnO_2$, to cerium, calculated as elemental cerium, in the top layer lies in a range of from 2.5 to 9 and quite particularly preferably in a range of from 3 to 7.

Below a ratio of 2.0 the proportion of cerium oxide becomes too high and thus an undesired potential color change occurs. Above a ratio of 10 too little cerium oxide is available to allow the synergetic effect of these two layers to develop. Furthermore, tin oxide, preferably $SnO_2$, is required in sufficient quantities to effect the desired weather-resistance. Quantities of tin oxide which are too high lead to an undesired shift of the interference color.

The oligomeric silanes are preferably water-based oligomeric silanes which are known from EP 0 675 128, EP 0 716 127 and EP 0 716 128. A use as organic compatibilizing layer in weather-resistant pearlescent pigments is known from EP 0 888 410 B1. This compatibilizing layer effects an excellent compatibility with the application system, usually the binder of a color or a coating.

These water-based, oligomeric silanes contain at least one type of functional group. By a functional binding group is meant, within the framework of this invention, a functional group which can interact chemically with the binder. The chemical interaction can consist of a covalent bond, a hydrogen bond or an ionic interaction. According to the invention at least one amino group is available as functional group. Furthermore, hydrophobic silane portions, preferably alkylsilane portions, which are covalently linked via siloxane bonds to the silane-containing functional groups, are contained in the water-based oligomeric silanes.

The choice of a suitable functional group depends on the chemical nature of the binder. A functional group that is chemically compatible with the functionalities of the binder is preferably chosen in order to allow good binding. This property is very important with regard to weather-resistant and UV-resistant pearlescent pigments, as a sufficiently strong adhesion between pigment and cured binder is achieved in this way. This can, for example, be verified in adhesion tests such as the cross cutting test with condensation water test loads according to DIN 50 017. Passing such a test represents a necessary condition for the use of weather-resistant pearlescent pigments in an automotive coating.

The oligomeric silanes to be used according to the invention must contain amino groups as functional group. The amino function is a functional group which can enter into one or more chemical interactions with most groups present in binders. This can include a covalent bond, such as e.g. with isocyanate or carboxylate functions of the binder, or hydrogen bonds such as with OH or COOR functions or also ionic interactions. An amino function is therefore very suitable for the purpose of the chemical binding of the pearlescent pigment to different types of binder.

In further preferred embodiments the oligomeric silanes have alkyl groups of from 1 to 18 C atoms. The pigment surface is partially hydrophobized by the alkyl groups, which allows a repulsion of water and a better plane-parallel orientation in the application medium.

The water-based, oligomeric silanes further preferably contain alkyl groups of from 1 to 8 C atoms and particularly preferably of from 2 to 6 C atoms, still further preferably of from 3 to 4 C atoms.

The alkyl groups can be linear, branched and optionally cyclic.

The water-based, oligomeric silanes are preferably produced by mixing water-soluble aminoalkylalkoxysilanes of the general formula II $$R\text{—}Si\text{—}(R^1)_y(OR^{1*})_{3-y},\quad (II)$$

preferably aminopropyltriethoxysilane, aminopropylmethyldiethoxysilane, aminopropyltrimethoxysilane or aminopropylmethyldimethoxysilane, with water-insoluble alkyltrialkoxysilanes of general formula IIIa $$R^2\text{—}Si(OR^{1**})_3 \quad (IIIa)$$

preferably propyltrimethoxysilane, propyltriethoxysilane, methyltriethoxysilane, methyltrimethoxysilane, ethyltrimethoxysilane, ethyltriethoxysilane, isobutyltrimethoxysilane or isobutyltriethoxysilane, and/or water-insoluble dialkyldialkoxysilanes of general formula IV $$AA'\text{-}Si(OR^{1***})_2 \quad (IV)$$

preferably dimethyldimethoxysilane, dimethyldiethoxysilane, methylpropyldimethoxysilane or methylpropyldiethoxysilane, and/or mixtures of water-insoluble alkyltrialkoxysilanes and dialkyldialkoxysilanes of general formulae III and IV, wherein R is an aminofunctional organic group, $R^1$, $R^{1*}$, $R^{1}$ and $R^{1*}$ independently from each other represent a methyl or ethyl radical, $R^2$ represents a linear or cyclic or branched alkyl radical with 1 to 8 C atoms, A represents an unbranched or branched alkyl radical with 1 to 3 C atoms and A' represents an unbranched or branched alkyl radical with 1 to 3 C atoms and $0<y\leq 1$, adding water to the mixture and adjusting the pH of the reaction mixture to a value between 1 and 8 and removing the alcohol already present and/or formed during the reaction.

The oligomeric silane can also be produced by mixing Q moles of water-soluble aminoalkylalkoxysilanes of general formula II $R\text{—}Si(R^1)_y(OR^{1*})_{3-y}$, preferably aminopropyltriethoxysilane, aminopropylmethyldiethoxysilane, aminopropyltrimethoxysilane or aminopropylmethyldimethoxysilane, with M moles of water-insoluble alkylalkoxysilanes of general formula IIIb $$R^3\text{—}Si(OR^{1**})_3 \quad (IIIb)$$

wherein R is an aminofunctional organic group, $R^1$, $R^{1*}$ and $R^{1**}$ represent a methyl or ethyl radical and $R^3$ represents a linear or cyclic or branched alkyl radical with 1 to 6 C atoms or a ureidoalkyl group of general formula V $$NH_2\text{—}CO\text{—}NH\text{—}(CH_2)_b\text{—},\text{ with } 1<b<6 \quad (V)$$

preferably b=3, and $0<y\leq 1$, in the molar ratio $0<M/Q\leq 2$, adding water to the mixture, adjusting the pH of the reaction mixture to a value between 1 and 8 and optionally removing the alcohol already present and/or formed during the reaction.

The oligomeric silane can also be obtained by mixing water-soluble organosilanes of general formula VI $$H_2N(Ch_2)_f(NH)_g(CH_2)_i\text{—}Si(CH_3)_h(OR^0)_{3-h} \quad (VI)$$

wherein $0\leq f\leq 6$, g=0 if f=0, g=1 if f>1, and wherein $0\leq i\leq 6$ and $0\leq h\leq 1$ and $R^0$ is a methyl, ethyl, propyl or isopropyl group, preferably aminopropyltriethoxysilane, organosilanes which are water-soluble, but not stable in aqueous medium, of general formula VII

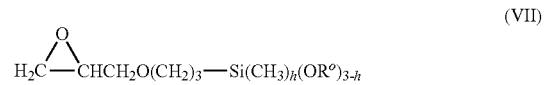

$$(VII)$$

wherein $0<h\leq 1$ and $R^0$ represents a methyl, ethyl, propyl or isopropyl radical, preferably glycidyloxypropyltrimethoxysilane, and/or of general formula VIII)

$$H_2C=CR'\text{—}COO(CH_2)_3\text{—}Si(CH_3)_h(OR^0)_{3-h} \quad (VIII)$$

wherein $0\leq h\leq 1$, $R^0$ represents a methyl, ethyl, propyl or isopropyl radical and R' represents a methyl or hydrogen radical, preferably methacryloxypropyltrimethoxysilane, and a water-insoluble organosilane of general formula IX)

$$R''\text{—}Si(CH_3)_h(OR^0)_{3-h} \quad (IX)$$

wherein $0\leq h\leq 1$, $R^0$ represents a methyl, ethyl, propyl or isopropyl radical and R" represents a linear, branched or cyclic hydrocarbon radical with 1 to 8 C atoms, preferably propyltrimethoxysilane, in the molar ratio M=a/(b+c+d), wherein a is the total number of moles of the organosilanes according to Formula VI, b is the total number of moles of the organosilanes according to Formula VII and c is the total number of moles of the organosilanes according to Formula VIII and d is the total number of moles of the organosilanes according to Formula IX, with $0\leq M\leq 3$, in particular for M is equal to 0 with a is equal to 0 and/or c is equal to d is equal to 0 and b 1 and preferably $0.5\leq M\leq 3$, adding a water/acid mixture to the mixture, adjusting the pH of the reaction mixture to a value between 1 and 8 and optionally removing the alcohol already present and/or formed during the reaction.

Preferably the amount of water that is added during the distillative separation of the alcohol is equal to the amount of alcohol or alcohol/water mixture that is removed from the reaction medium. Monobasic acids are particularly suitable for adjusting the pH. Products produced in this way also release no further alcohols by hydrolysis upon dilution with water and have a flashpoint well above 70° C.

The water-based oligomeric silanes clearly bind extremely well to the cerium-containing layer and therefore, in contrast to the state of the art, no further metal oxide layer is required for this in the top layer. The optical properties of the pearlescent pigment according to the invention are not impaired by the low tin oxide and cerium oxide content. With the help of the water-based oligomeric silane systems, groups which are insoluble or poorly soluble in water, such as for example alkyl groups of silanes, can bind without difficulty to the surface of the pearlescent pigments.

The obtained water-based oligomeric silanes, i.e. water-based organopolysiloxane-containing compositions, are substantially free from organic solvents and have a flashpoint above 70° C. As the alkoxy groups have already been substantially hydrolyzed by the mixing with water, less than 5 wt.-% alcohols, for example methanol and/or ethanol, are released by hydrolysis upon dilution with water. This results for example in compounds with the following approximate structure (Formula X)

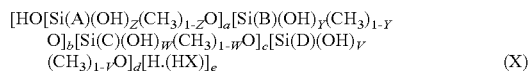

(X)

wherein
A=aminoalkyl radical derived from general formula VI,
B=glycidyl ether alkyl radical derived from general formula VII,
C=acryloxyalkyl or methacryloxyalkyl radical of general formula VIII,
D=alkyl radical of general formula IX,
HX=monobasic acid, wherein X=inorganic or organic acid radical, such as e.g. chloride, nitrate, formate, acetate,
v is equal to 0 or 1 and w is equal to 0 or 1 and y is equal to 0 or 1 and z is equal to 0 or 1 and $a+b+c+d \geq 4$ and $a \leq e \leq 2a$, with $0 < a/(b+c+d) \leq 3$, and for $0.5 \leq a/(b+c+d) \leq 3$.

The task of the silicon-functional hydroxyl groups is to form chemical bonds to the hydroxyl groups of the cerium-containing layer on the pearlescent pigment surface. A stable bond is thereby formed between silane and pigment surface.

The task of the organofunctional groups of the oligomeric silane is to produce bonds to the polymer of the application system, for example of a waterborne coating. As the oligomers can be provided with several functional groups which are different from each other, the pigment can be used in different waterborne coating systems. Being provided with methacryl and amino groups means, for example, that the pigment can be used for waterborne coating systems with polyester as polymer and for waterborne coating systems with polyurethane as polymer.

The obtained water-based oligomeric silanes, i.e. water-based organopolysiloxane-containing compositions, are advantageously substantially free from organic solvents and have a flashpoint above 70° C. As the alkoxy groups have already been substantially hydrolyzed by mixing with water, less than 5 wt.-% alcohols, such as e.g. methanol and/or ethanol, are released by hydrolysis on dilution with water.

Examples of water-based oligomeric silanes are aqueous, alcohol-free aminosilane hydrolyzate (Dynasylan Hydrosil 1151), aqueous, alcohol-free amino/alkylfunctional siloxane co-oligomer (Dynasylan Hydrosil 2627), aqueous, alcohol-free diamino/alkylfunctional siloxane co-oligomer (Dynasylan Hydrosil 2776), aqueous, alcohol-free amino/vinylfunctional siloxane co-oligomer (Dynasylan Hydrosil 2907), aqueous, alcohol-free amino/alkylfunctional siloxane co-oligomer (Dynasylan Hydrosil 2909), aqueous, alcohol-free amino/alkylfunctional siloxane co-oligomer (Dynasylan Hydrosil 2909), Hydrosil 2926) or aqueous, alcohol-free amino/methacrylatefunctional siloxane co-oligomer (Dynasylan Hydrosil 2929), oligomeric diaminosilane system (Dynasylan 1146).

Other silanes can also be used. However, preferably exclusively water-based oligomeric silanes are used.

The oligomeric silane systems can be used in relatively small quantities as they act very effectively. The content thereof can be determined indirectly from the C content of the pearlescent pigment according to the invention. The C content of the pearlescent pigments according to the invention preferably lies in a range of from 0.03 to 0.5 wt.-% and particularly preferably in a range of from 0.1 to 0.35 wt.-%, in each case relative to the total weight of the pearlescent pigment.

The C value can be determined for example using the CS-200 device (supplier: Lico Instrumente GmbH). Here, the C content is determined in the form of $CO_2$ after controlled combustion of the pigment sample.

These very low C contents make it possible to conclude that there is a correspondingly low proportion of oligomeric silanes on the surface of the pearlescent pigments and therefore an amazingly high effectivity of this compatibilizing layer.

It is highly preferred that the coating of the pearlescent pigments with the entire top layer takes place in aqueous environment.

Coating in aqueous environment is less expensive than in organic medium and avoids the problem of disposing of organic solvents.

The object is furthermore according to the present invention by the provision of a process for the production of weather-resistant pearlescent pigment according to one of the previous claims,
characterized in that
the process comprises the following steps:
a) optionally classifying coated or uncoated platelet-shaped substrates, obtaining substrates which preferably have the values $D_{10}$, $D_{50}$, $D_{90}$ from a cumulative frequency distribution of a volume-averaged size distribution function with a span $\Delta D$ in a range of from 0.7-1.4,
b) suspending coated or uncoated platelet-shaped substrates, optionally from step a), in aqueous solution, and coating the coated or uncoated platelet-shaped substrates with one or more highly refractive metal oxide(s), obtaining pearlescent pigments which are optionally calcined,
c) coating the pearlescent pigments coated in step b) in aqueous solution with tin oxide, tin hydroxide and/or hydrated tin oxide by hydrolysis of a tin salt or of a hydrolyzable tin metalorganic compound in a pH range of from 1.5 to 3.0,
d) coating the pearlescent pigments coated in step c) in aqueous solution with cerium oxide, cerium hydroxide and/or hydrated cerium oxide by hydrolysis of a cerium salt or of a hydrolyzable cerium metalorganic compound,
e) coating the pearlescent pigments coated in step d) in aqueous solution with oligomeric silanes,
f) separating off the pearlescent pigments coated in step e), optionally washing with demineralized water, and
g) optional drying, preferably at a temperature from a range of from 80° to 160° C.

To precipitate the tin oxide layer, preferably $SnO_2$ layer, work is preferably done at a pH in a range of from 1.6 to 2.5 and particularly preferably of from 1.7 to 2.3. The pH is preferably kept constant by simultaneously adding acid or base or a suitable buffer system.

The reaction temperature preferably lies in a range of from 50 to 95° C. and further particularly in a range of from 65 to 85° C.

Suitable salts for the precipitation of the tin oxide layer, preferably $SnO_2$ layer, are the salts of the tetravalent tin, such as for example $SnCl_4$, $Sn(NO_3)_4$, $Sn(SO_4)_2$ or $Sn(acetate)_4$.

To precipitate the cerium-containing layer which comprises or consists of cerium oxide and/or cerium hydroxide and/or hydrated cerium oxide, salts or hydrolyzable cerium metalorganic compounds such as cerium(III) acetate, cerium (III) acetylacetonate, cerium(III) nitrate, cerium(III) chloride, cerium(III) sulfate or cerium(IV) ammonium nitrate are preferably used. The precipitation is carried out at a temperature from a range of preferably 30 to 100° C., still further preferably 40 to 75° C. The pH of this precipitation is preferably in a range of from 3 to 7 and is, if necessary, kept constant by simultaneously adding acid or base or a suitable buffer system.

The precipitation or binding of the water-based oligomeric silane to or onto the pigment surface preferably takes place at a temperature from a range of from 75 to 80° C. and preferably at a pH from a range of from 5 to 11.

The pigment substrates can be classified using suitable devices such as centrifuges, screens, decanters or cyclones or sedimentation units, wherein any combinations of these devices and the associated techniques are also possible.

The influence of the coating on the optical properties of pearlescent pigments becomes clear in particular following condensation water loading. In a base coat/clear coat system, the condensation water test moreover makes it possible to draw conclusions about the wetting and embedding of the pearlescent pigments in the binder matrix. After loading under precisely defined conditions in the condensation water test according to DIN 50 017 (condensation water—constant climates), on the one hand the adhesion is assessed by means of the cross cutting test, as are also the optical properties, such as distinctness of image (DOI), swelling behavior or gloss, compared with an unloaded sample.

Despite condensation water loading, the optical properties of the pearlescent pigments according to the invention are only slightly impaired. The pearlescent pigments according to the invention also show surprisingly good results in the cross cutting test. It has been shown that the use of an oligomeric silane system on the coated pigment surface makes it much more difficult for water or moisture to penetrate the coating. It is assumed that this can be attributed to an improved combination of the degree of silane cross-linking and degree of silane binding to the coated pigment surface. In an oligomeric silane system to be used according to the invention there is already an increased degree of silane cross-linking because of the oligomerization. A homogeneous surface modification on the coated pigment surface is hereby guaranteed. The degree of silane binding defines the binding strength between the coated pigment surface and the oligomeric silane system to be used according to the invention.

A comparison of the pearlescent pigments according to the invention with pearlescent pigments having only one cerium-containing layer clearly shows that the latter exhibit both a loss of their optical properties in the condensation water test and also do not exhibit the desired adhesion in the cross cutting test. Surprisingly, in the condensation water test, the pearlescent pigments according to the invention display comparable or even better results than pearlescent pigments which have both a cerium-containing and an $SiO_2$ layer, which has been surface-modified with monomeric silanes, in the layer structure.

The fact that the replacement of an $SiO_2$ layer surface-modified with monomeric silanes with an oligomeric silane system leads to no loss of the adhesion and optical properties under the condensation water test conditions was not foreseeable. With regard to pigments known from the state of the art which have an $SiO_2$ layer as additional barrier layer it was surprising that weather-resistant pigments can be obtained even without this additional barrier layer. In addition to a cost saving in the production process, it is extremely advantageous that, by saving on one layer, pearlescent pigments can be obtained which fulfill the requirements, such as e.g. weather resistance, and the optical properties are nevertheless only marginally influenced by additional layers.

Oligomeric silane systems, compared with monomeric silanes or mixtures of monomeric silanes, have the advantage that when the oligomeric silane systems are used, a pre-crosslinked composition is applied to the coated pigment surface. When monomeric silanes are used, however, because of the competitive situation between silane components and OH groups of the coated pigment surfaces of different reactivities, a coating with a variable degree of cross-linking is applied. For example, it can be demonstrated that the degree of silane cross-linking of highly reactive monomeric aminosilanes such as Dynasylan AMEO can vary greatly on the coated pigment surface and therefore the surface modification can be inhomogeneous. Due to the competitive situation between the OH groups of the monomeric silanes and the reactive OH groups on the surface of the pigments to be coated, the degree of silane binding to the coated pigment surface can also vary and thus lead to a further inhomogeneity of the surface modification. This inhomogeneity of the surface modification is manifested in poorer optical and adhesion properties, in particular under the condensation water test conditions.

A further factor, which is not insignificant in particular for external applications and in automotive coatings is the weathering resistance of the pigments used. In an accelerated weathering test, the pearlescent pigments according to the invention are characterized by their small deviations in color shade or their low loss of gloss.

Because of the UV activity of titanium dioxide-containing pearlescent pigments, which can trigger an accelerated decomposition of organic compounds, e.g. of a binder matrix, stabilized pearlescent pigments are used in external applications. In order to check the effectiveness of the stabilization, coating applications of pearlescent pigments are exposed to UV light and then measured by colorimetry in comparison with the corresponding unloaded samples. The deviation in color shade $\Delta E^*$ is a measure of the light fastness of the pigmented coating. The pearlescent pigments according to the invention only marginally influence the optical properties of a melamine-containing coating following UV exposure.

A subject-matter of the invention is moreover the use of the pearlescent pigments according to the invention for the pigmentation of coatings, printing inks, plastics and cosmetics. For this, they can be used as mixtures with pigments customary in the trade, for example inorganic and organic absorption pigments, effect pigments, such as metallic effect pigments and pearlescent pigments and/or LCP pigments.

Preferred uses of the weather-resistant pearlescent pigments according to the invention are coatings, varnishes, automotive coatings, powder coatings and printing inks.

In a further embodiment, the present invention comprises weather-resistant pearlescent pigments based on synthetic mica platelets which is coated with at least one rutile $TiO_2$ layer. The quantity of $TiO_2$ is at least 40 wt.-%, relative to the total weight of the pearlescent pigment. The top layer has the following components:

a) 1.5 to 2.5 wt.-% tin oxide, calculated as $SnO_2$, relative to the total weight of the pearlescent pigment, followed by b) a cerium-containing layer, calculated as elemental cerium, in a quantity of from 0.5 to 0.9 wt.-% cerium, relative to the total weight of the pearlescent pigment, and c) an outer organic layer, which can also be denoted as compatibilizing layer, which consists of water-based oligomeric silanes, wherein these comprise amino groups.

In a further embodiment, the invention comprises weather-resistant pearlescent pigments based on glass platelets with a span ΔD of from 0.8 to 1.2, which is coated with at least one rutile $TiO_2$ layer. The quantity of $TiO_2$ is at least 40 wt.-%, relative to the total weight of the pearlescent pigment. The top layer has the following components:

a) 1.5 to 2.5 wt.-% tin oxide, calculated as $SnO_2$, relative to the total weight of the pearlescent pigment, followed by b) a cerium-containing layer, calculated as elemental cerium, in a quantity of from 0.5 to 0.9 wt.-% cerium, relative to the total weight of the pearlescent pigment, and c) an outer organic compatibilizing layer, which consists of water-based oligomeric silanes, wherein these comprise amino groups.

According to a preferred variant of the invention, the top layer of the pearlescent pigment according to the invention consists exclusively of the three layers a), b) and c). The tin oxide layer and cerium-containing layer, as defined above, are preferably uncalcined layers.

EXAMPLES

The following examples are intended to explain the invention in more detail, without, however, limiting it. All percentages are to be understood as wt.-%.

I Production of the Pigments

Example 1

100 g commercially available blue pearlescent pigment based on $TiO_2$-coated synthetic mica with the fineness 10-40 µm (Symic C261, from Eckart) was suspended in 900 g water. The dispersion was then heated to 70° C. and at a pH of 2.2 a solution of 5.17 g $SnCl_4 \times 5H_2O$ in 45 ml dilute hydrochloric acid was metered in at a rate of 2 ml/min, wherein the pH was kept constant by simultaneous dropwise addition of 20% sodium hydroxide solution. Stirring then continued for a further 20 min and the pH was increased to 4.2 with sodium hydroxide solution. A solution consisting of 2.17 g $Ce(NO_3)_3 \times 6 H_2O$ dissolved in 50 ml demineralized water was then metered in. At the same time, the pH was kept constant by dropwise addition of a 10% NaOH solution. After all of the solution had been added, stirring continued for 1 h after which the pH was adjusted to 10 with dilute sodium hydroxide solution. 5.7 g Dynasylan 1146 diluted with 24.3 g demineralized water was then added to the suspension followed by stirring for 180 min, then the suspension was filtered off and the filter cake subsequently washed with demineralized water. The filter cake was dried under vacuum at 95° C.

The pigment had an $SnO_2$ content of 2.2 and a Ce content of 0.7 wt.-% (corresponding to 0.82 wt.-% $Ce_2O_3$), relative to the total weight of the pigment.

The pigment had the following particle size distribution (MALVERN Mastersizer MS 2000): $D_{10}$=11.2 µm, $D_{50}$=22.5 µm, $D_{90}$=39.2 µm. The C content was 0.2 wt.-%.

Example 2

100 g commercially available red pearlescent pigment based on $TiO_2$-coated synthetic mica with the fineness 10-40 µm (Symic C241, from Eckart) was suspended in 900 g water. The dispersion was then heated to 70° C. and at a pH of 2.2 a solution of 5.64 g $SnCl_4*5H_2O$ in 45 ml dilute hydrochloric acid was metered in at a rate of 2 ml/min, wherein the pH was kept constant by simultaneous dropwise addition of 20% sodium hydroxide solution. Stirring then continued for a further 20 min and the pH was increased to 4.2 with sodium hydroxide solution. A solution consisting of 2.17 g $Ce(NO_3)_3 \times 6H_2O$ dissolved in 50 ml demineralized water was then metered in. At the same time, the pH was kept constant by dropwise addition of a 10% NaOH solution. After all of the solution had been added, stirring continued for 1 h after which the pH was adjusted to 10 with dilute sodium hydroxide solution, 5.7 g Hydrosil 2627 diluted with 24.3 g demineralized water was then added to the suspension followed by stirring for 180 min, then the suspension was filtered off and the filter cake subsequently washed with demineralized water. The filter cake was dried under vacuum at 95° C.

The pigment had an $SnO_2$ content of 2.4 and a Ce content of 0.7 wt.-% (corresponding to 0.82 wt.-% $Ce_2O_3$), relative to the total weight of the pigment.

The pigment had the following particle size distribution (MALVERN Mastersizer MS 2000): $D_{10}$=10.6 µm, $D_{50}$=22.3 µm, $D_{90}$=40.4 µm. The C content was 0.1 wt.-%.

Example 3

100 g of the green-colored pearlescent pigment obtained from comparison example 7 was suspended in 900 g water. The dispersion was then heated to 70° C. and at a pH of 2.2 a solution of 5.64 g $SnCl_4*5H_2O$ in 45 ml dilute hydrochloric acid was metered in at a rate of 2 ml/min, wherein the pH was kept constant by simultaneous dropwise addition of 20% sodium hydroxide solution. Stirring then continued for a further 20 min and the pH was increased to 4.2 with sodium hydroxide solution. A solution consisting of 2.17 g $Ce(NO_3)_3 \times 6H_2O$ dissolved in 50 ml demineralized water was then metered in. At the same time, the pH was kept constant by dropwise addition of a 10% NaOH solution. After all of the solution had been added, stirring continued for 1 h after which the pH was adjusted to 10 with dilute sodium hydroxide solution. 5.7 g Hydrosil 2907 diluted with 24.3 g demineralized water was then added to the suspension followed by stirring for 180 min, then the suspension was filtered off and the filter cake subsequently washed with demineralized water. The filter cake was dried under vacuum at 95° C.

The pigment had $SnO_2$ content of 2.4 and a Ce content of 0.7 wt.-% (corresponding to 0.82 wt.-% $Ce_2O_3$), relative to the total weight of the pigment.

The pigment had the following particle size distribution (MALVERN Mastersizer MS 2000): $D_{10}$=8.7 µm, $D_{50}$=18.8 µm, $D_{90}$=35.9 µm. The C content was 0.1 wt.-%.

Comparison Example 1

100 g commercially available blue pearlescent pigment based on $TiO_2$-coated mica with the fineness 5-25 µm (PHOENIX PX 2261, from Eckart) was suspended in 900 g water. The dispersion was then heated to 70° C. and at a pH of 2.4 a solution of 2.30 g $SnCl_4 \times 5H_2O$ in 45 ml dilute hydrochloric acid was metered in at a rate of 2 ml/min, wherein the pH was kept constant by simultaneous dropwise addition of 20% sodium hydroxide solution. After subsequently stirring for 30 min, the solid was filtered off, washed with water and dried at 120° C.

The dry, coated pigment was suspended in 300 ml isopropanol and brought to boiling temperature. Accompanied by stirring, first 2.0 g $H_2O$ and then, within one hour, a solution of 2.17 g $Ce(NO_3)_3 \times 6H_2O$ in 100 g isopropanol were added. A solution of 0.45 g ethylene diamine in 8 g $H_2O$ was then added. Over a period of 2 h, 14.6 g tetraethoxysilane and 20 g isopropanol were then introduced continuously with a dosing pump (Ismatec). The suspension was then allowed to continue reacting for 6 h further. 0.4 g Dynasylan AMEO and 1.3 g Dynasylan 9116 were then added and cooling was allowed to take place slowly. The mixture was stirred at room temperature overnight and filtered off by suction the next day. The pigment filter cake was then dried under vacuum at 100° C. for 6 hours.

The pigment had an $SnO_2$ content of 1.0%, a cerium content of 0.7 wt.-%, a C content of 0.9 wt.-% and an $SiO_2$ content of 4.2 wt.-%.

Comparison Example 2

100 g commercially available blue pearlescent pigment based on $TiO_2$-coated synthetic mica with the fineness 10-40 µm (Symic C261, from Eckart) was suspended in 900 g water. The dispersion was then heated to 70° C. and at a pH of 2.4 a solution of 2.30 g $SnCl_4 \times 5$ $H_2O$ in 45 ml dilute hydrochloric acid was metered in at a rate of 2 ml/min, wherein the pH was kept constant by simultaneous dropwise addition of 20% sodium hydroxide solution. After subsequently stirring for 30 min, the solid was filtered off, washed with water and dried at 120° C.

The dry, coated pigment was suspended in 300 ml isopropanol and brought to boiling temperature. Accompanied by stirring, first 2.0 g $H_2O$ and then, within one hour, a solution of 2.17 g $Ce(NO_3)_3 \times 6H_2O$ in 100 g isopropanol were added. A solution of 0.45 g ethylene diamine in 8 g $H_2O$ was then added. Over a period of 2 h, 14.6 g tetraethoxysilane and 20 g isopropanol were then introduced continuously with a dosing pump (lsmatec). The suspension was then allowed to continue reacting for 6 h further. 0.4 g Dynasylan AMEO and 1.3 g Dynasylan 9116 were then added and cooling was allowed to take place slowly. The mixture was stirred at room temperature overnight and filtered off by suction the next day. The pigment filter cake was then dried under vacuum at 100° C. for 6 hours.

The pigment had a theoretical $SnO_2$ content of 1.0%, a cerium content of 0.7%, a C content of 0.9 wt.-% and an $SiO_2$ content of 4.2 wt.-%.

Comparison Example 3

100 g commercially available blue pearlescent pigment based on $TiO_2$-coated synthetic mica with the fineness 10-40 µm (Symic C261, from Eckart) was suspended in 900 g water. The dispersion was then heated to 70° C. and at a pH of 2.4 a solution of 2.30 g $SnCl_4 \times 5$ $H_2O$ in 45 nil dilute hydrochloric acid was metered in at a rate of 2 ml/min, wherein the pH was kept constant by simultaneous dropwise addition of 20% sodium hydroxide solution. The pH was then increased to 7.5 with 5 wt.-% NaOH solution and stirring was carried out for 15 min. A water glass solution (15 g water glass solution, 3.9 wt.-% $SiO_2$, mixed with 20.7 g demineralized water) was then introduced slowly into the suspension and the pH was kept constant at pH 7.5. Stirring was then continued for a further 20 min and the pH was reduced to 4.2 with dilute hydrochloric acid. A solution consisting of 2.17 g $Ce(NO_3)_3 \times 6H_2O$ dissolved in 50 ml demineralized water was then metered in. At the same time, the pH was kept constant by dropwise addition of a 10% NaOH solution. After all of the solution had been added, stirring continued for 1 h after which the pH was adjusted to 10 with dilute sodium hydroxide solution. 0.4 g Dynasylan AMEO and 1.3 g Dynasylan 9116 were then added into the suspension followed by stirring for 280 min, then the suspension was filtered off and the filter cake subsequently washed with demineralized water. The filter cake was dried under vacuum at 95° C.

The pigment had a Ce content of 0.7 wt.-%, relative to the total weight of the pigment.

The pigment had the following particle size distribution (MALVERN Mastersizer MS 2000): $D_{10}=11.5$ µm, $D_{50}=22.9$ µm, $D_{90}=39.6$ µm.

Comparison Example 4

100 g commercially available blue pearlescent pigment based on $TiO_2$-coated synthetic mica with the fineness 10-40 µm (Symic C261, from Eckart) was suspended in 900 g water. The dispersion was then heated to 70° C. and at a pH of 2.4 a solution of 2.30 g $SnCl_4 \times 5$ $H_2O$ in 45 ml dilute hydrochloric acid was metered in at a rate of 2 ml/min, wherein the pH was kept constant by simultaneous dropwise addition of 20% sodium hydroxide solution. Stirring was then continued for a further 20 min and the pH was reduced to 4.2 with dilute hydrochloric acid. A solution consisting of 2.17 g $Ce(NO_3)_3 \times 6H_2O$ dissolved in 50 ml demineralized water was then metered in. At the same time, the pH was kept constant by dropwise addition of a 10% NaOH solution. After all of the solution had been added, stirring continued for 1 h after which the pH was adjusted to 10 with dilute sodium hydroxide solution. 0.4 g Dynasylan AMEO and 1.3 g Dynasylan 9116 were then added to the suspension followed by stirring for 280 min, then the suspension was filtered off and the filter cake subsequently washed with demineralized water. The filter cake was dried under vacuum at 95° C.

The pigment had a Ce content of 0.7 wt.-%, relative to the total weight of the pigment.

The pigment had the following particle size distribution (MALVERN Mastersizer MS 2000): $D_{10}=11.2$ µm, $D_{50}=22.5$ µm, $D_{90}=38.9$ µm.

Comparison Example 5

100 g commercially available red pearlescent pigment based on $TiO_2$-coated synthetic mica with the fineness 10-40 µm (Symic C241, from Eckart) was suspended in 900 g water. The dispersion was then heated to 70° C. and at a pH of 2.4 a solution of 2.48 g $SnCl_4 \times 5$ $H_2O$ in 45 ml dilute hydrochloric acid was metered in at a rate of 2 ml/min, wherein the pH was kept constant by simultaneous dropwise addition of 20% sodium hydroxide solution. Stirring then continued for a further 20 min. After this, the pH was subsequently adjusted to 10 with dilute sodium hydroxide solution. 5.7 g Hydrosil 2627 diluted with 24.3 g demineralized water was then added to the suspension followed by stirring for 180 min, then the suspension was filtered off and the filter cake subsequently washed with demineralized water. The filter cake was dried under vacuum at 95° C.

The pigment had the following particle size distribution (MALVERN Mastersizer MS 2000): $D_{10}$=10.9 µm, $D_{50}$=21.8 µm, $D_{90}$=38.6 µm. The C content was 0.1 wt.-%.

Comparison Example 6

100 g of the pigment from comparison example 7 was suspended in 850 ml demineralized water and heated to 85° C. with vigorous stirring. The pH was reduced to 4.2 with dilute hydrochloric acid. A solution consisting of 0.93 g Ce(NO$_3$)$_3$×6 H$_2$O dissolved in 40 ml demineralized water was then metered in. At the same time, the pH was kept constant by dropwise addition of a 10% NaOH solution. After all of the solution had been added, stirring continued for 1 h after which the pH was adjusted to 10 with dilute sodium hydroxide solution. 5.7 g Dynasylan 1146 diluted with 24.3 g demineralized water was then added to the suspension followed by stirring for 180 min, then the suspension was filtered off and the filter cake subsequently washed with demineralized water. The filter cake was dried under vacuum at 95° C. The pigment had a theoretical Ce content of 0.3 wt.-%, relative to the total weight of the pigment.

The pigment had the following particle size distribution (MALVERN Mastersizer MS 2000): $D_{10}$=8.2 µm, $D_{50}$=18.2 µm, $D_{90}$=35.3 µm. The C content was 0.2 wt.-%.

Comparison Example 7

100 g synthetic mica platelets FM1040 from Jhejan, China with the particle size distribution according to a MALVERN Mastersizer MS 2000: $D_{10}$=11.4 µm, $D_{50}$=21.8 µm, $D_{90}$=40.0 µm, was suspended in 850 ml demineralized water and heated to 80° C. accompanied by stirring. The pH was reduced to 1.9 with dilute hydrochloric acid. A layer was then formed by adding a solution consisting of 3 g SnCl$_4$×5 H$_2$O (in 10 ml conc. HCl plus 50 ml demineralized water), with simultaneous metering—in of a 10% NaOH. The pH was then reduced to pH 1.6 with dilute HCl and then a solution of 950 ml TiCl$_4$ (200 g TiO$_2$/l demineralized water) was metered into the suspension in parallel with 10% strength aqueous sodium hydroxide solution. After the coating had ended stirring was carried out for 1 h before filtering off. The filter cake was dried at 90° C. in a vacuum drying cabinet for 12 h and then calcined. An intensively green interfering pearlescent pigment was obtained (3$^{rd}$ order interference).

Comparison Example 8

Red interference pearlescent pigment based on synthetic mica platelets Symic C241 from Eckart GmbH.

II Characterization of the Pigments

IIa Particle Size Measurement

The size distribution curve of the platelet-shaped synthetic substrates and of the pearlescent pigments was determined with a device from Malvern (device: MALVERN Mastersizer 2000) according to the manufacturer's instructions. For this, approx. 0.1 g of the corresponding substrate or pigment as aqueous suspension, without addition of dispersion auxiliaries, was introduced by means of a Pasteur pipette into the sample preparation chamber of the measuring device, accompanied by constant stirring, and measured several times. The resultant average values were formed from the individual measurement results. The scattered light signals were evaluated according to the Fraunhofer method.

By the average size $D_{50}$ is meant within the framework of this invention the $D_{50}$ value of the cumulative frequency distribution of the volume-averaged size distribution function, as obtained by laser diffraction methods. The $D_{50}$ value indicates that 50% of the non-metallic platelet-shaped synthetic substrates or pigments have a diameter which is equal to or smaller than the value indicated, for example 20 µm. Correspondingly, the $D_{90}$ value indicates that 90% of the substrates or pigments have a diameter which is equal to or smaller than the respective value. Furthermore, the $D_{10}$ value indicates that 10% of the substrates or pigments have a diameter which is equal to or smaller than the respective value.

IIb Determination of the Average Thickness of the Platelet-Shaped Synthetic Substrates To determine the average thickness of the non-metallic platelet-shaped synthetic substrates, the substrates or the pigments were incorporated to a level of 10 wt.-% in an Autoclear Plus HS 2K clear coat from Sikkens, with a brush and applied to a film using a spiral doctor blade (26 µm wet film thickness) and dried. After drying for 24 h, cross-section polishes of these doctor-blade drawdowns were prepared and measured by scanning electron microscopy. At least 100 pigment particles were measured here in order to obtain informative statistics.

IIc Determination of the Cerium Oxide Content

The cerium oxide contents of the pigments were determined by means of X-ray fluorescence analysis (XRFA).

For this, the pigment was incorporated into a lithium tetraborate glass tablet, fixed in solid sample measuring vessels and measured therefrom. The Advantix ARL device from Thermo Scientific was used as measuring device.

III Weather-Resistance of the Pigments

A Condensation Water Test

A few pigment samples were incorporated into a waterborne coating system and the test applications produced by spray painting. The base coat was overcoated with a 1K clear coat customary in the trade and then stoved. These applications were tested according to DIN 50 017 (condensation water—constant climates). The adhesion was tested by means of cross cutting according to DIN EN ISO 2409 immediately after completion of the test in comparison with the unloaded sample. Here, Gt 0 means no change and Gt 5 a very significant change.

The swelling behavior was assessed visually immediately after condensation water loading according to DIN 53230. Here, the value 0 means no change and the value 5 a very significant change.

Finally the DOI (distinctness of image) was assessed visually. It is influenced, i.a., also by the respective substrate and can change substantially as a result of the swelling processes due to the retention of water.

TABLE 1

Condensation water results

| Sample | Gloss 20° before CW test | Gloss 20° after CW test | Loss of gloss in % | DOI | Immediate cross cutting | Swelling visual |
|---|---|---|---|---|---|---|
| Example 1 | 88.7 | 85.6 | 3.5% | 80.6 | 0 | 1 |
| Example 2 | 88.6 | 88.7 | 0% | 82.3 | 1 | 0 |

TABLE 1-continued

Condensation water results

| Sample | Gloss 20° before CW test | Gloss 20° after CW test | Loss of gloss in % | DOI | Immediate cross cutting | Swelling visual |
|---|---|---|---|---|---|---|
| Comparison example 1 | 90.0 | 79.1 | 12.1% | 85.4 | 0 | 2 |
| Comparison example 2 | 88.5 | 55.4 | 37.4% | 76.8 | 0 | 4 |
| Comparison example 3 | 88.5 | 21.3 | 75.9% | 80.1 | 4 | 4 |
| Comparison example 4 | 88.3 | 68.2 | 22.8% | 79.8 | 2 | 3 |

The examples according to the invention had an optimal condensation water resistance. Comparison examples 1 and 2 likewise exhibited very good cross cutting results. However, comparison example 2 exhibited an extremely strong swelling behavior, which can presumably be explained by the additional $SiO_2$ layer. The negative, swelling influence of the $SiO_2$ layer was additionally confirmed by comparison examples 3 and 4.

Comparison examples 3 and 4 furthermore exhibited a significantly poorer adhesion (cross cutting) which can be explained i.a. by the use of monomeric silane systems. In comparison example 4, in which all coatings took place in aqueous environment, the binding of the silanes, in particular of the hydrophobic alkysilane, to the pigment surface was presumably not optimal.

As the hydrolysis and condensation rates of different monomeric silanes can thus differ significantly (by up to a factor of 850), as described in "Hydrolysis and Condensation of organosilanes—EU 10-002/MS/fk/September 97", with the use of two different silanes, as takes place in comparison examples 1 to 4 and 6, it is very probable that the aminosilane hydrolyzes and/or condenses significantly earlier and can thus fix on the pigment surface first. The degree of cross-linking of the already converted aminosilane is thus also different and the surface modification can be very inhomogeneous. Only much later does condensation occur, and thus precipitation of the alkylsilane which in this way can cover some of the introduced cross-linking groups from the aminosilane, and these are no longer available for binding to the coating system. A coating with alkylsilane, both because of the pre-coating with already converted aminosilane and also because of steric hindrance due to the alkyl group, might also not be able to bind optimally to the coated pigment surface, which could explain the more pronounced swelling of the coating layer and thus less favorable intercoat adhesion.

The high DOI value of comparison example 1 can be explained by means of the starting material used. In this example only an interference pigment Blue based on natural mica was used. This is significantly thinner than comparable pigments based on synthetic mica, whereby the "distinctness of image" is positively influenced.

B WOM Test (Based on Red or Green Pigments with Synthetic Mica as Substrate)

The pigment samples were incorporated into a waterborne coating system and the test applications were produced by spray painting. The base coat was overcoated with a clear coat customary in the trade and then stoved. The accelerated weathering test took place according to SAE 2527 in a Q-Sun Xe 3 HS (Q-Lab) Xenon test device. The determination of the $\Delta E^*$ values and grayscale classification took place in each case relative to the corresponding unloaded sample.

| | Loss of gloss 20° after 4000 h | Color change $\Delta E^*$ after 4000 h |
|---|---|---|
| Example 2 | 18% | 1.42 |
| Comparison example 8 | 43% | 3.45 |
| Comparison example 6 | 16% | 2.14 |

The reduction in gloss and the change in color were most strongly pronounced in comparison example 8. Comparison example 6 (without $SnO_2$ layer) exhibited good gloss retention but the change in color was simply insufficient due to the higher photoactivity.

C UV Resistance on Doctor-Blade Drawdowns

This test was carried out according to the UV rapid test described in EP 0 870 730 to determine the photochemical UV activity of $TiO_2$ pigments.

For this, 1.0 g of the pearlescent pigment was dispersed in 9.0 g of a melamine-containing coating rich in double bonds. Doctor-blade drawdowns were prepared on carded paper and dried at room temperature. The doctor-blade drawdowns were divided and in each case one of the two sections was stored in the dark as an unloaded comparison sample. The samples were then irradiated in a QUV device from Q-Panel for 150 min with UV-containing light (UVA-340 lamp, irradiation intensity 1.0 W/m²/nm). Immediately after completion of the test, color values of the loaded test pieces were ascertained relative to the respective reference sample using a CM-508i colorimeter from Minolta. The resulting $\Delta E^*$ values, calculated according to the Hunter-L*a*b*-Formula, are shown in Table 2.

In the test, essentially a gray-blue discoloration of the $TiO_2$ layer of the pearlescent pigment in the doctor-blade drawdowns is observed because of Ti(III) centers formed under the influence of UV light. The condition for this is that the electron hole has physically left the $TiO_2$ and—for example due to reaction with olefinic double bonds of the binder cannot immediately recombine again with the remaining electron. As a melamine-containing coating layer significantly slows down the diffusion of water (vapor) and oxygen onto the pigment surface, there is a significant delay in reoxidation of the titanium(III) centers with the result that the graying can be measured and the $\Delta E$ value can be used as a measure for the UV resistance of the pigments. A higher $\Delta E^*$ numerical value of the loaded sample relative to the unloaded reference sample thus means a lower UV resistance of the examined pigment.

TABLE 2

UV doctor-blade test results

| Sample | Composition | $\Delta E^*$ |
|---|---|---|
| Example 1 | Symic C261/$SnO_2$/Ce(OH)$_3$/olig. silane | 1.0 |
| Example 2 | Symic C241/$SnO_2$/Ce(OH)$_3$/olig. silane | 1.6 |
| Example 3 | Interference Green/$SnO_2$/Ce(OH)$_3$/olig. silane | 3.2 |
| Comparison example 5 | Symic C241/$SnO_2$ | 21.4 |
| Comparison example 6 | Interference Green/Ce(OH)$_3$/olig. silane | 10.4 |
| Comparison example 7 | Interference Green | 28.3 |
| Comparison example 8 | Symic C241 (Interference Red) | 24.0 |

All the comparison examples exhibited a much greater color change ($\Delta E^*$) following corresponding exposure to light. The additional $SnO_2$ intermediate layer of the pigments according to the invention acts as an additional barrier layer vis-à-vis moisture, whereby, in conjunction with the cerium hydroxide layer, radical formation on the surface of the pigments is inhibited and thus the photoactivity is significantly reduced. If the pigments are coated only with the individual components, the stabilizing effect is still visible but is significantly less than in the combination according to the invention.

D Color-Shade Constancy and Optical Properties Compared with the Starting Material Any color-shade changes occurring were examined visually on the basis of doctor-blade drawdowns of the respective pigments in a conventional nitrocellulose coating (Dr. Renger Erco bronzing mixed varnish 2615e; from Morton, pigmentation of 6 wt.-%, relative to the total weight of the wet varnish) on black-white opacity charts (Byko-Chart 2853, Byk Gardner). It was ascertained here that with the pearlescent pigments according to the invention no difference can be visually detected with respect to the starting material. In contrast, doctor-blade drawdowns of the pigments of comparison examples 1-3 exhibited scattered so-called specks in relation to the starting material used in the comparison examples.

The invention claimed is:

1. A weather-resistant pearlescent pigment, comprising:
  a coated or uncoated platelet-shaped substrate which is selected from the group consisting of synthetic mica platelets, glass platelets, $SiO_2$ platelets, $Al_2O_3$ platelets, synthetic boehmite platelets, BiOCl platelets and mixtures thereof,
  a chromophoric coating comprising at least one highly refractive metal oxide, and
  a top layer,
  wherein the top layer comprises the following layer sequence:
  a) a first layer comprising tin oxide and/or tin hydroxide and/or hydrated tin oxide,
  b) a second cerium-containing layer consisting of cerium oxide and/or cerium hydroxide and/or hydrated cerium oxide,
  c) an organic-chemical coating applied to the cerium-containing layer which comprises one or more oligomeric silane(s), wherein the oligomeric silane(s) have one or more amino groups and the oligomeric silane(s) are chemically bonded with the cerium-containing layer.

2. The weather-resistant pearlescent pigment according to claim 1, wherein,
  the substrate is selected from the group consisting of synthetic mica platelets, glass platelets and mixtures thereof.

3. The weather-resistant pearlescent pigment according to claim 1, wherein,
  the proportion of tin oxide, tin hydroxide and/or hydrated tin oxide, calculated as $SnO_2$, in the top layer lies in a range of from 0.4 to 4.0 wt.-%, relative to the total weight of the pearlescent pigment.

4. The weather-resistant pearlescent pigment according to claim 1, wherein,
  the weight ratio of tin oxide, tin hydroxide and/or hydrated tin oxide, calculated as $SnO_2$, to Ce, calculated as elemental Ce, in the top layer lies in a range of from 2 to 10.

5. The weather-resistant pearlescent pigment according to claim 1, wherein,
  the proportion by weight of Ce, calculated as elemental Ce, in the top layer lies in a range of from 0.05 to 1.5 wt %, relative to the total weight of the pearlescent pigment.

6. The weather-resistant pearlescent pigment according to claim 1, wherein,
  the proportion by weight of C (carbon proportion), lies in a range of from 0.03 to 0.5 wt.-%, relative to the total weight of the pearlescent pigment.

7. The weather-resistant pearlescent pigment according to claim 1, wherein,
  the top layer consists of layers a), b) and c).

8. The weather-resistant pearlescent pigment according to claim 1, wherein,
  the reaction products of the oligomeric silanes independently of one another have one or more alkyl groups of from 1 to 18 C atoms.

9. The weather-resistant pearlescent pigment according to claim 1, wherein,
  the proportion of the top layer on all of the pearlescent pigment lies in a range of from 1.0 to 5.0 wt.-%, relative to the total weight of the pearlescent pigment.

10. The weather-resistant pearlescent pigment according to claim 1, wherein,
  the coating of the pearlescent pigment with all of the top layer takes place in aqueous environment.

11. The weather-resistant pearlescent pigment according to claim 1, wherein,
  the substrate is coated with one or more chromophoric, highly refractive metal oxide layer(s) which is selected from the group consisting of $TiO_2$, $Fe_2O_3$, $TiFe_2O_5$, $Fe_2Ti_3O_9$, $FeTiO_3$ and mixtures thereof.

12. The weather-resistant pearlescent pigment according to claim 11, wherein,
  the chromophoric, highly refractive coating comprises $TiO_2$ in the rutile structure.

13. The weather-resistant pearlescent pigment according to claim 12, wherein,
  the proportion of $TiO_2$ in the rutile structure lies in a range of from 30 to 80 wt.-%, relative to the total weight of the pearlescent pigment.

14. The weather-resistant pearlescent pigment according to claim 12, wherein,
  the chromophoric, highly refractive coating with $TiO_2$ in the rutile structure has an average thickness which lies in a range of from 80 to 280 nm.

15. The weather-resistant pearlescent pigment according to claim 1, wherein,
  the weather-resistant pearlescent pigment has a cumulative frequency distribution based on a volume-averaged size distribution function with the values $D_{10}$, $D_{50}$, $D_{90}$, with a span $\Delta D$ of from 0.7-1.4, wherein the span $\Delta D$ is calculated according to Formula (I):

$$\Delta D = (D_{90} - D_{10})/D_{50} \qquad (I).$$

16. The weather-resistant pearlescent pigment according to claim 15, wherein,
  the pearlescent pigment has a span $\Delta D$ in a range of from 0.75-1.3.

17. A process for the production of weather-resistant pearlescent pigment according to claim 1, wherein,
  the process comprises the following steps:
  a) optionally classifying coated or uncoated platelet-shaped substrates, obtaining substrates which preferably have the values $D_{10}$, $D_{50}$, $D_{90}$ from a cumulative frequency distribution of a volume-averaged size distribution function with a span ΔD in a range of from 0.7-1.4, b) suspending coated or uncoated platelet-shaped substrates, optionally from step a), in aqueous solution, and coating the coated or uncoated platelet-shaped substrates with one or more highly refractive metal oxide(s), obtaining pearlescent pigments which are optionally calcined, c) coating the pearlescent pigments coated in step b) in aqueous solution with tin oxide, tin hydroxide and/or hydrated tin oxide by hydrolysis of a tin salt or of a hydrolyzable tin metalorganic compound in a pH range of from 1.5 to 3.0, d) coating the pearlescent pigments coated in step c) in aqueous solution with cerium oxide, cerium hydroxide and/or hydrated cerium oxide by hydrolysis of a cerium salt or of a hydrolyzable cerium metalorganic compound, e) coating the pearlescent pigments coated in step d) in aqueous solution with one or more oligomeric silane(s), f) separating off the pearlescent pigments coated in step e), optionally washing with demineralized water, and g) optionally drying the pearlescent pigments of step f).

18. The process of using the weather-resistant pearlescent pigment of claim 1 for the pigmentation of coatings, printing inks, plastics and cosmetics.

19. The weather-resistant pearlescent pigment according to claim 1, wherein the organic-chemical coating consists of one or more oligomeric silane(s), wherein the oligomeric silane(s) have one or more amino groups and the oligomeric silane(s) are chemically bonded with the cerium-containing layer.

20. The weather-resistant pearlescent pigment according to claim 11, wherein, the chromophoric, highly refractive coating consists of $TiO_2$ in the rutile structure.

21. The process according to claim 17, wherein the pearlescent pigments of step f) are optionally dried at a temperature from 80° C. to 160° C.

22. A weather-resistant pearlescent pigment, comprising:
a coated or uncoated platelet-shaped substrate which is selected from the group consisting of synthetic mica platelets, glass platelets, $SiO_2$ platelets, $Al_2O_3$ platelets, synthetic boehmite platelets, BiOCl platelets and mixtures thereof,
a chromophoric coating comprising at least one highly refractive metal oxide, and
a top layer,
wherein the top layer comprises the following layer sequence:
a) a first layer comprising tin oxide and/or tin hydroxide and/or hydrated tin oxide,
b) a second cerium-containing layer consisting of cerium oxide and/or cerium hydroxide and/or hydrated cerium oxide,
c) an organic-chemical coating applied to the cerium-containing layer which comprises one or more oligomeric silane(s), wherein the oligomeric silane(s) have one or more amino groups and the oligomeric silane(s) are chemically bonded with the cerium-containing layer, and
wherein the proportion of tin oxide, tin hydroxide, and/or hydrated tin oxide, calculated as $SnO_2$, in the first layer of the top layer lies in a range of from 0.4 to 4.0 wt.-%, relative to the total weight of the pearlescent pigment.

23. The weather-resistant pearlescent pigment according to claim 22, wherein the proportion of tin oxide, tin hydroxide, and/or hydrated tin oxide, calculated as $SnO_2$, in the first layer of the top layer lies in a range of from 1.0 to 3.0 wt.-%, relative to the total weight of the pearlescent pigment.

24. A weather-resistant pearlescent pigment, consisting of:
a coated or uncoated platelet-shaped substrate which is selected from the group consisting of synthetic mica platelets, glass platelets, $SiO_2$ platelets, $Al_2O_3$ platelets, synthetic boehmite platelets, BiOCl platelets and mixtures thereof,
a chromophoric coating comprising at least one highly refractive metal oxide, and a top layer,
wherein the top layer consists of the following layer sequence:
a) a first layer comprising tin oxide and/or tin hydroxide and/or hydrated tin oxide,
b) a second cerium-containing layer consisting of cerium oxide and/or cerium hydroxide and/or hydrated cerium oxide,
c) an organic-chemical coating applied to the cerium-containing layer which comprises one or more oligomeric silane(s), wherein the oligomeric silane(s) have one or more amino groups and the oligomeric silane(s) are chemically bonded with the cerium-containing layer.

* * * * *